Patented May 22, 1928.

1,670,312

UNITED STATES PATENT OFFICE.

CLAYTON OLIN NORTH, OF TALLMADGE TOWNSHIP, SUMMIT COUNTY, AND CHESTER WILLIAM CHRISTENSEN, OF AKRON, OHIO, ASSIGNORS TO THE RUBBER SERVICE LABORATORIES CO., OF AKRON, OHIO, A CORPORATION OF OHIO.

ART OF VULCANIZING RUBBER.

No Drawing.   Application filed May 19, 1924. Serial No. 714,467.

Our invention is directed to the art of accelerating the vulcanization of rubber, and is particularly directed to the use of certain compounds produced by the interaction of unsaturated aldehydes upon amines as accelerators of vulcanization as is hereinafter set forth. More particularly, we prefer to use as accelerators those compounds obtained by the interaction of any primary amine, and particularly any primary aromatic amine, such as aniline, a toluidine, or a xylidene, with an unsaturated straight chain aliphatic aldehyde, for example, croton-aldehyde. It is to be understood, however, that, broadly, our invention covers the use as an accelerator of vulcanization of the reaction product of any amine with any unsaturated aldehyde of the aliphatic series wherein the unsaturation in addition to that present in the aldehyde grouping, also includes that present in the hydrocarbon nucleus of said compound. It is further to be understood that the unsaturation present in the hydrocarbon nucleus may be either of the type known as the double bond type,—that is $\diagup C=C\diagdown$ or of the type referred to as the triple bond type,—that is —C≡C—. Aldehydes of these types must, of necessity, contain at least three carbon atoms, and as set forth in the claims of our invention, we limit ourselves in the preparing of our accelerators solely to the use of unsaturated straight chain aldehydes containing three or more carbon atoms. Our preferred class of compounds are, then, Schiff's bases, prepared by the reaction of amines with unsaturated aldehydes.

The products which we prefer to use as accelerators of vulcanization may be prepared by any desirable method. The following is illustrative of one process which may be used.

Equal molecular proportions of a primary amine and an unsaturated aldehyde are mixed together and the mixture heated for any desired time, for example, approximately three hours over the water bath. This is simply to ensure complete interaction between the reacting substances, whereupon the water of condensation is distilled off, preferably by vacuum drying at a temperature of about 90° C. The reaction may also be carried out by heating a mixture of equal molecular proportions (or any multiple thereof) of an amine and an unsaturated aldehyde up to the temperature of the boiling water bath for a short time to break any suspension formed. The heating is then continued for a short time at a lower temperature and the mass is then allowed to stand at room temperature for a number of hours. The mixture is then heated for an hour or two over a boiling water bath to complete the reaction, and the product dried as before.

The above methods are simply illustrative of any methods which may be used to prepare the preferred type of compound and of themselves form no part of the present invention. Differences in the procedure followed in making condensation products of the preferred type of compounds are dependent upon the properties of the interacting ingredients, and are readily apparent to those skilled in the art of making such compounds. It is simply necessary to impose such reacting conditions as will enable complete interaction, that is, condensation, to take place between the amine and the unsaturated straight chain aliphatic aldehyde chosen. Thus, by way of example, equal molecular proportinos of aniline and of croton-aldehyde may be mixed together, and the mixture heated over a boiling water bath, any evaporation of the contents of the flask being prevented by connection with a reflux condenser. After about three hours heating, the product is vacuum dried at a temperature of about 90° C. In this case, the reaction taking place is probably as follows:—

$CH_3.CH=CH.CHO + H_2N.C_6H_5 =$
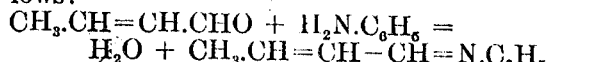

Illustrative of the use of compounds of the type described in the acceleration of the vulcanization of rubber goods, we give the following example. If 100 parts of rubber of the grade known to the trade as smoked sheet, 5 parts of zinc oxide, 3.5 parts of sulfur, and 1 part of the reaction product of an amine and an unsaturated straight chain aldehyde prepared as described above (for example, the croton-aldehyde aniline reaction product, be mixed together in the well known manner upon the rubber mills, and the resulting mix vulcanized by heating in a press for 20 minutes at 40 pounds steam pressure, a product having excellent commercial properties results. This product could be advantageously used as a tire friction compound, and possesses a tensile strength of about 3300 pounds per square inch, an ultimate elongation of approximately 860% while the load necessary to produce an elongation of 300% is approximately 151 pounds per square inch. Other means of using our preferred type of compound are readily apparent to those skilled in the art of rubber compounding.

It is sufficient to say that by means of this type of compound, that is by the incorporation of relatively small proportions of the simple condensation product of a primary amine with an unsaturated straight chain aldehyde into a rubber mix, we have been enabled to materially decrease the time ordinarily required for the vulcanization of rubber and have produced a product possessing qualities of high commercial value. Other types of compounds obtainable by the interaction of primary aromatic amines with unsaturated straight chain aldehydes are disclosed and claimed as rubber vulcanization accelerators in our copending application Serial No. 714,468, filed May 19, 1924.

It is to be understood that we do not limit ourselves solely to the use of compounds produced by the interaction of ingredients mentioned in this specification, nor do we limit ourselves by any theories used in explanation of the reaction involved in producing our preferred type of accelerating compound, but we limit ourselves solely by the claims hereinafter made, and included as part of this specification and in which we intend to claim all rights inherent in our invention which are permissible in view of the prior art.

We claim:—

1. The process of producing vulcanized rubber which comprises incorporating into rubber the reaction product of aniline and croton aldehyde, and heating the resultant mixture with a vulcanizing agent to effect vulcanization.

2. The process of producing vulcanized rubber which comprises incorporating into rubber the condensation product of equi-molecular proportions of aniline and croton aldehyde, and heating the resultant mixture with a vulcanizing agent to effect vulcanization.

3. A rubber product derived from rubber combined with the reaction product of aniline and croton-aldehyde, and vulcanized.

4. A rubber product derived from rubber combined with the condensation product of equimolecular proportions of aniline and croton-aldehyde and vulcanized.

5. A method of accelerating the vulcanization of rubber that consists in vulcanizing the same in the presence of an aldehyde aromatic amine reaction product, part or all of the aldehyde reagent constituting croton aldehyde.

6. A method of accelerating the vulcanization of rubber that consists in vulcanizing the same in the presence of an aldehyde aniline reaction product, part or all of the aldehyde reagent constituting croton aldehyde.

7. A method of accelerating the vulcanization of rubber that consists in vulcanizing the same in the presence of a croton aldehyde aniline reaction product.

8. A process of treating rubber which comprises combining the rubber with a vulcanizing agent and a condensation product of croton aldehyde with a primary aromatic amine, and vulcanizing the rubber.

CLAYTON OLIN NORTH.
CHESTER WILLIAM CHRISTENSEN.